United States Patent [19]

Huwyler

[11] 4,072,893

[45] Feb. 7, 1978

[54] APPARATUS FOR DETERMINING THE ANGULAR POSITION OF A ROTATING MEMBER USING REFERENCE AND POSITION ELEMENTS THAT GENERATE OPPOSITE POLARITY BIPOLAR SIGNALS

[75] Inventor: Franco Huwyler, Monza (Milan), Italy

[73] Assignee: Fabbrica Italiana Magneti Marelli S.p.A., Milan, Italy

[21] Appl. No.: 701,148

[22] Filed: June 30, 1976

[30] Foreign Application Priority Data

Oct. 10, 1975 Italy .................................. 28152/75

[51] Int. Cl.² ........................................... G01R 33/12
[52] U.S. Cl. ................................... 324/208; 33/1 PT; 235/103; 340/271; 340/282; 340/347 P
[58] Field of Search .............. 324/34 R, 34 D, 34 PS, 324/34 GT; 33/1 N, 1 PT; 340/271, 282, 195, 204, 20 L, 347 P; 235/103 R, 103 S

[56] References Cited

U.S. PATENT DOCUMENTS

| 3,132,337 | 5/1964 | Martin | 340/347 P |
| 3,562,741 | 2/1971 | McEvoy et al. | 340/347 P |
| 3,930,201 | 12/1975 | Ackermann et al. | 324/34 PS |

*Primary Examiner*—Robert J. Corcoran
*Attorney, Agent, or Firm*—Ostrolenk, Faber, Gerb & Soffen

[57] ABSTRACT

A system utilizing a single sensor for locating angular positions of a rotating member relative to an angular reference position is provided with means which, for each revolution of the rotating member, generates a bipolar reference signal at the reference position and a bipolar position signal of reversed polarity from the bipolar reference signal. At the second half waves of the bipolar reference and position signals respective unidirectional reference and position signals are generated. The latter are converted to logic signals corresponding to angular positions of the rotating member relative to the reference position and the unidirectional reference signals are utilized to control cycle repetition.

6 Claims, 4 Drawing Figures

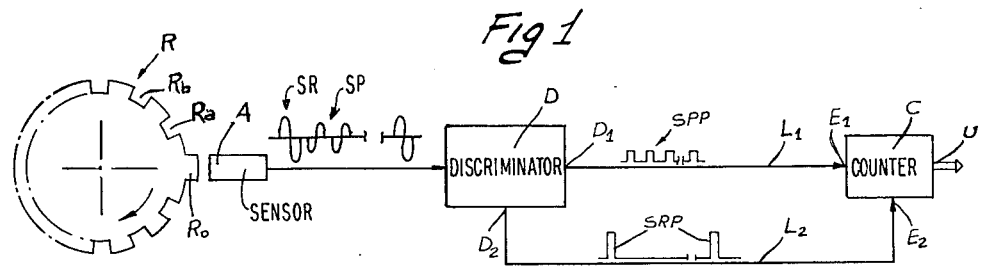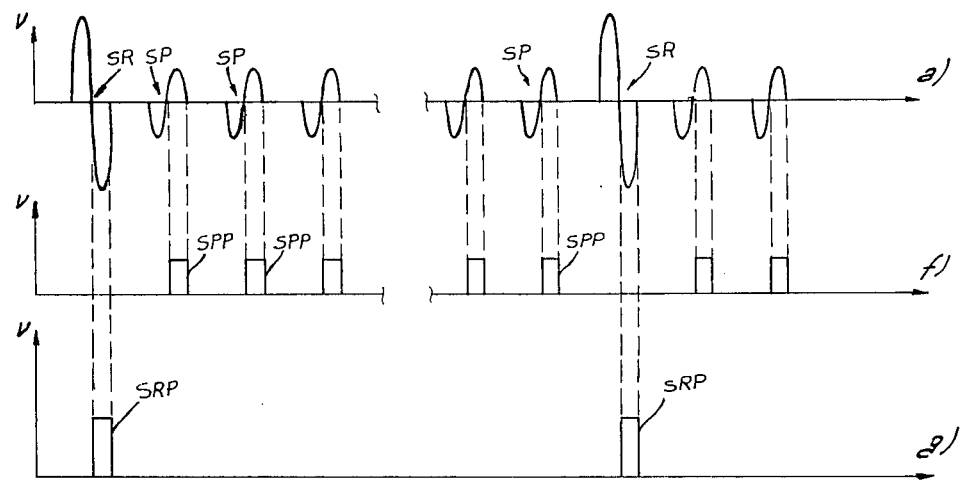

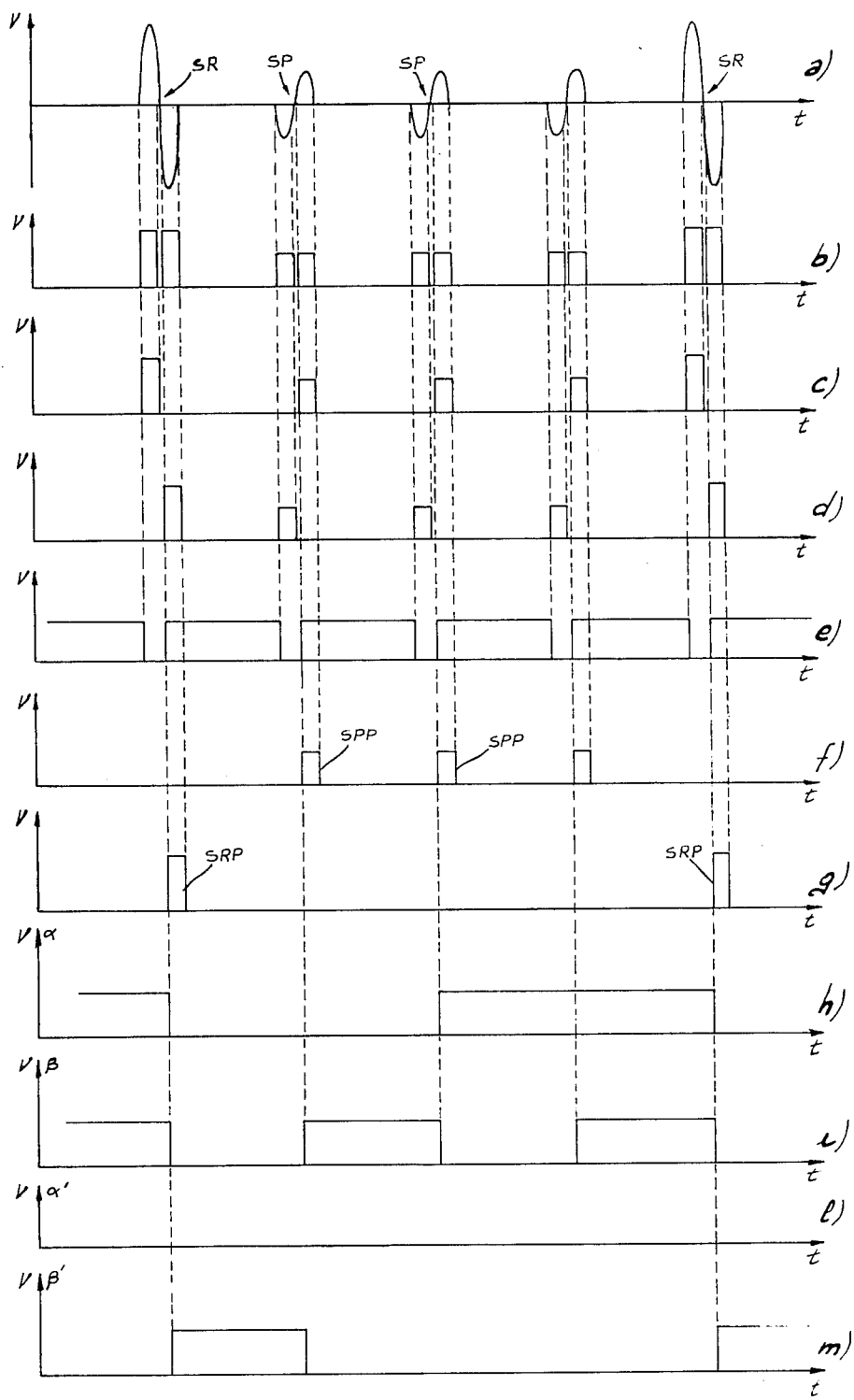

APPARATUS FOR DETERMINING THE ANGULAR POSITION OF A ROTATING MEMBER USING REFERENCE AND POSITION ELEMENTS THAT GENERATE OPPOSITE POLARITY BIPOLAR SIGNALS

BACKGROUND OF THE INVENTION

This invention is concerned with an apparatus for locating a plurality of angular positions of a rotating member with respect to an angular reference position.

Known are systems for locating angular positions of a rotating member based on detecting a pluality of pulses as determined by particular characteristics of the rotating member as the latter rotates. Such systems require a sensor for sensing an angular reference position and at least another sensor for sensing the other angular positions or fractions of round angle.

It is the object of the present invention to provide a an apparatus for determining the angular positions of a rotating member with respect to a predetermined angular reference, by using a single simple sensor, with resulting benefits in wiring simplicity, reliability and cost.

According to the invention, the system for each revolution of the rotating member consists of providing both an reference signal indicative of the angular reference position, a plurality of position signals, 180° out of phase with the reference signal, each indicative of a different angular position of the rotating member; providing at the second half wave of the bipolar reference signal and position signals a unidirectional reference signal and unidirectional position signals, respectively; converting the unidirectional position signals into logic signals corresponding to the angular positions of the rotating member relative to the reference position; and using the unidirectional reference signal for controlling the cycle repetition.

BRIEF DESCRIPTION OF THE DRAWINGS

The invention will now be disclosed by mere way of example, with reference to the following description and accompanying drawings, in which:

FIG. 1 is a block diagram of the electronic apparatus of the present invention;

FIG. 2 is a timing diagram illustrating various signals of FIG. 1 appearing in the circuit;

FIG. 3 is a block diagram showing a particular embodiment of the apparatus of FIG. 1; and FIG. 4 schematically is a timing diagram illustrating various signals appearing in the circuit of FIG. 3.

DETAILED DESCRIPTION OF THE DRAWINGS

Referring to FIG. 1, reference character R designates a gear wheel provided with an angular reference element $R_o$ and and a plurality of angular position elements $R_a$, $R_b$, etc., having characteristics that are uniform to one another, but different from that of element $R_o$. By way of example, element $R_o$ is a tooth, and elements $R_a$; $R_b$, etc., are slots formed on the gear wheel periphery. Said reference and position elements have coupled thereto an electromagnetic passive type of simple sensor A, the output of which is directly connected to a discriminating-limiting device D which, in turn, is connected through two lines $L_1$, $L_2$ to a counter C.

During each revolution of gear wheel R, sensor A generates a single bipolar reference signal SR and a plurality of bipolar position signals SP (see FIG. 2a) the reference signal SR is generated when tooth $R_o$ in front of sensor A. Each position signal SP is generated when a different one of the slots $R_a$, $R_b$, etc., pass in front of the sensor A. Position signals SP are 180° out of phase with reference signals SR. This relationship, as stated above, is causd by the configuration of tooth $R_o$, and slots $R_a$, $R_b$, etc.

Device D discuminates between the alternate incoming bipolar signals SP and SR, so as to supply at its outputs $D_1$ and $D_2$, respectively, unipolar signals of restricted amplitude SPP and SRP (see FIGS. 2f and 2g), respectively at the second half wave of bippolar signals SP and SR.

Signals SPP and SRP are supplied to inputs $E_1$, $E_2$ of counter C, respectively, via lines $L_1$ and $L_2$ (see FIG. 1).

Counter C counts position signals SPP, while being reset by reference signals SRP, and supplies at output U logic signals identifying the several angular positions of elements $R_a$, $R_b$, etc. with respect to angular reference position $R_o$.

FIG. 3 shows an embodiment of discriminating device D coupled through sensor A with a gear wheel R provided with three slots $R_1$, $R_2$ and $R_3$ respectivel at 90°, 180°, 270° with respect to reference tooth $R_o$. Said device comprises a rectifying-limiting bridge PR having its output 1 connected to input $BS_1$ of a bistable T-type (flip-flop) circuit BS via OR gate $P_4$. Outputs 2 and 3 of bridge PR are connected to counter C through two AND gates $P_1$ and $P_2$ respectively. Gates $P_1$ and $P_2$ are enabled to conduct by the output signal of said bistable circuit BS. Inputs 2, 3 of rectifying bridge PR have applied thereto the bipolar signals SR and SP shown in FIG. 4a and which are similar to these of FIG. 2a.

Signals SR and SP, as rectified and of restricted amplitude appear between terminals 1 and 0 of rectifying bridge PR. See FIG. 4b.

Positive amplitude-restricted half waves of signals SR and SP appear between terminals 2 and 0 (see FIG. 4c), and negative rectified amplitude-restricted half waves of signals SR and SP appear between terminals 3 and 0 (see FIG. 4d).

Logical signals appear at output $BS_2$ of bistable circuit BS (see FIG. 4e), the logical level of which changes at each leading edge of the signals applied to its input $BS_1$. Such logical signals enable gates $P_1$ and $P_2$, so that at the output of gate $P_1$ signals SPP are provided (see FIG. 4f) corresponding to the second half waves of bioplar position signals SP, and at the output of gate $P_2$ signals SRP are provided (see FIG. 4g) corresponding to the second half waves of bioplar reference signals SR. Signals SPP and SRP, similar to those of FIGS. 2f and 2g, are applied by means of lines $L_1$ and $L_2$ to inputs $E_1$ and $E_2$ of counter C, the former to be counted and the latter to control counter reset.

With a gear wheel R provided with three slots $R_1$, $R_2$ and $R_3$, a two bit counting capacity will suffice for counter C. In such a case, at the arrival of signals SPP the two outputs $\alpha$ and $\beta$ supply logical signals locating the angular positions of elements $R_1$, $R_2$ and $R_3$ relative to tooth $R_o$. As shown in FIGS. 4h and 4i, the logical levels at outputs $\alpha$ and $\beta$ of counter C are, respectively:

0 0 at the arrival of signal SRP and correspond to the passage of tooth $R_o$ in front of sensor A;

0 1 at the arrival of the first signal SPP and correspond to the passage of slot $R_1$ in front of sensor A, and hence to 90° angle between tooth $R_o$ and slot $R_1$;

1 0 at the arrival of the second signal SPP and correspond to the passage of slot $R_2$ in front of sensor A, and hence to 180° angle between tooth $R_o$ and slot $R_2$;

1 1 at the arrival of the third signal SPP and correspond to the passage of slot $R_3$ in front of sensor A, and hence to 270° angle between tooth $R_o$ and slot $R_3$.

In order to take into account any possible errors of the signals at output of bistable circuit BS, the apparatus shown in FIG. 3 further comprises a control counter CR connected to the outputs of AND gates $P_1$ and $P_2$ and having its outputs $\alpha'$ and $\beta'$ reactively connected to the input of bistable circuit BS through a third AND gate $P_3$ and a OR gate $P_4$. AND gate $P_3$ has a reverse input as shown. As noted above, output 1 of rectifying bridge PR is also connected to the input of bistable circuit BS through OR gate $P_4$. Counter CR counts the SRP signals on line $L_2$, and is reset by SPR signals on line $L_1$. The logical signals shown in FIGS. 4l and 4m illustrate the signals appearing at outputs $\alpha'$ and $\beta'$, of counter CR, respectively, when the apparatus is operating correctly. In this condition, the output of AND gate $P_3$ is never true and the only signal applied to bistable circuit BS is the signal from output 1 of rectifying bridge PR.

Should the logical level of output of bistable circuit BS be wrong or uncorrect, either due to an initial level opposite to that anticipated, or an uncorrect counting start, the output signal of AND gates $P_1$ and $P_2$ are no longer those of FIGS. 4f and 4g, and the outputs $\alpha'$ and $\beta'$ of counter CR will become true and false, respectively. This will cause logical correcting signals to be generated by AND gate $P_3$ causing switching bistable circuit BS to restore its correct logical level.

Reference was made to a gear wheel having three slots and a counter C having a two bit counting capacity, it being of course understood that as the number of slots increases, the counter counting capacity should increase.

Obviously, the operating scheme of the discriminating-limiting device may be differently embodied provided that, supplied by signals SR and SP in the case not necessarily of a sinusoidal nature, it is capable of supplying the counter with signals SPP and SRP of FIGS. 2f and 2g.

What is claimed is:

1. Apparatus for determining the angular position of a rotating member, said member having a reference element and a plurality of position elements, the structure of said reference element being different from the structure of said position elements, said elements being angular spaced about said rotating member in the direction of rotation said apparatus comprising:
   sensor means responsive to the relative structure of the reference and position elements for generating a bipolar reference signal each time said reference element moves past a reference point and for generating a bipolar position signal each time one of said position elements moves past said reference point, each of said bipolar reference and position signals comprising an alternating positive and negative pulse, the order of occurrence of said positive and negative pulses of said bipolar reference signal being opposite to that of the bipolar position signals;
   discriminator means responsive to the order of said positive and negative pulses of said bipolar reference and said bipolar position signals for distinguishing between said bipolar reference and said bipolar position signals and, for generating a unipolar reference signal or a unipolar position signal each time said sensor means generates one of said bipolar reference or one of said bipolar position signals, respectively;
   signal generating means responsive to said unipolar reference and unipolar position signals for generating an output signal indicative of the angular position of said rotating member relative to said reference point.

2. The apparatus of claim 1 wherein said signal generating means comprises a binary counter having a clock and a reset input and wherein said discriminator means applies said unipolar position signals to said clock input and said unipolar reference signals to said reset input.

3. The apparatus of claim 2 further including means for automatically correcting errors in the operation of said discriminator means if said discriminator means applies said unipolar reference signal to said clock input of said counter and/or said unipolar position signals to said reset input of said counter.

4. The apparatus of claim 2 wherein said discriminator means comprises:
   first gate means;
   second gate means;
   rectifier means responsive to said bipolar signals generated by said sensor means for applying a unipolar signal to one of said first or second gate means each time a positive portion of either said bipolar reference or bipolar position signals is generated by said sensor means whereby, due to the reverse order of said positive and negative pulses of said bipolar reference and position signals, the unipolar signal applied to said one of said first or second gate means when a positive portion of said bipolar reference signal is generated by said sensor means is from the opposite portions of the bipolar cycle with respect to said unipolar signal applied to said one of said first or second gate means when a positive portion of said bipolar position signal is generated by said sensor means;
   said rectifier means also for applying a unipolar signal to the other of said first or second gate means each time a negative portion of either said bipolar reference or said bipolar position signals is generated by said sensor means whereby, due to the reverse order of said positive and negative pulses of said bipolar reference and position signals, the unipolar signal applied to said other of said first and second gate means when a negative portion of said bipolar reference signal is generated by said sensor means is from the opposite portions of the bipolar cycle with respect to the unipolar signal applied to said other of said first and second gate means when a negative portion of said bipolar position signal is generated by said sensor means;
   means for gating said first and second gate means in such a manner that only said unipolar reference signals of said unipolar position signals appears at the output of said first gate means and only the other of said unipolar reference signals or said unipolar position signals appears at the output of said second gate means.

5. The apparatus of claim 4 wherein said gating means gates only those unipolar signals applied to said first and second gate means during the same half of the cycle of said bipolar reference and bipolar position signals generated by said sensor means the particular half cycle being different in the two gates.

6. The apparatus according to claim 5 further including means for correcting the operation of said gating means whenever said gating means gates said unipolar signals applied to said first and second gate means during the other half of said cycle of said bipolar reference and bipolar position signals generated by said sensor means.

* * * * *